United States Patent [19]

Lin

[11] Patent Number: 5,496,126

[45] Date of Patent: Mar. 5, 1996

[54] BICYCLE FRONT FORK MOUNTING STRUCTURE

[76] Inventor: Wen-Hwa Lin, No. 262, Sec. 1, Chung Shan Road, Ta Chia Chen, Taichung Hsien, Taiwan

[21] Appl. No.: 360,027

[22] Filed: Dec. 20, 1994

[51] Int. Cl.$^6$ ..................................................... B62K 21/18
[52] U.S. Cl. ........................ 403/370; 403/373; 74/551.1; 280/279
[58] Field of Search ............................. 403/26, 365, 367, 403/368, 369, 370, 371, 373, 374, 409.1; 74/551.1; 280/279, 280; 384/538

[56] References Cited

U.S. PATENT DOCUMENTS

| | | | |
|---|---|---|---|
| 630,176 | 8/1899 | Brown | 403/370 |
| 4,202,644 | 5/1980 | Soussloff | 403/369 |
| 4,340,238 | 7/1982 | Cabeza | 403/370 X |
| 5,163,758 | 11/1992 | Chi | 280/279 X |
| 5,291,797 | 3/1994 | Chi | 74/551.1 |
| 5,319,993 | 6/1994 | Chiang | 74/551.1 |
| 5,330,220 | 7/1994 | Nagano | 280/279 |
| 5,332,245 | 7/1994 | King | 280/279 |

FOREIGN PATENT DOCUMENTS

| | | | |
|---|---|---|---|
| 447882 | 11/1912 | France | 280/279 |
| 1144142 | 2/1963 | Germany | 280/280 |

*Primary Examiner*—Kenneth J. Dorner
*Assistant Examiner*—Harry C. Kim
*Attorney, Agent, or Firm*—Varndell Legal Group

[57] ABSTRACT

A bicycle front fork mounting structure including a locating socket mounted around the top coupling tube of the front fork and supported on a ball bearing above the head tube of the bicycle frame, the locating socket having an outer thread and a tapered center through hole, a split holding-down ring fitted into the tapered center through hole of the locating socket, and a lock nut threaded onto the outer thread of the locating socket to compress the holding-down ring by forcing an inside annular flange thereof into an outside annular groove on the holding-down ring, causing the holding-down ring and the locating socket to securely fix the front fork to the head tube.

1 Claim, 4 Drawing Sheets

BICYCLE FRONT FORK MOUNTING STRUCTURE

BACKGROUND AND SUMMARY OF THE INVENTION

The present invention relates to a bicycle front forks, and relates more particularly to a bicycle front fork mounting structure which securely fixes the front fork to the head tube.

FIG. 1 shows a bicycle front fork mounting structure according to the prior art, which is comprised of a front fork, a bottom socket, a head tube, a top socket, a packing ring, a stem, and a screw cap. The bottom socket is sleeved onto the top coupling tube of the front fork, then the head tube, the top socket, and the packing ring are respectively sleeved onto the top coupling tube of the front fork in proper order, and then the front fork coupling of the stem is sleeved onto the top coupling tube of the front fork, and then the screw cap is threaded into the top inner thread of the top coupling tube of the front fork to securely fix the parts together. This bicycle front fork mounting structure has drawbacks. Because the front fork must be processed with a top inner thread for the connection of the screw cap, the manufacturing process of the front fork is complicated, and the manufacturing cost of the front fork is relatively increased. Furthermore, because the stem must be simultaneously fastened to the front fork so as to securely fix the front fork to the head tube, the positioning of the handlebar is relatively limited.

It is one object of the present invention to provide a bicycle front fork mounting structure which is easy to assemble. It is another object of the present invention to provide a bicycle front fork mounting structure which is inexpensive to manufacture. It is still another object of the present invention to provide a bicycle front fork mounting structure which securely fixes the front fork to the head tube.

According to the preferred embodiment of the present invention, the bicycle front fork mounting structure comprises a locating socket mounted around the top coupling tube of the front fork and supported on a ball bearing above the head tube of the bicycle frame, which locating socket has an outer thread and a tapered center through hole, a split holding-down ring fitted into the tappered center through hole of the locating socket, and a lock nut threaded onto the outer thread of the locating socket to compress the holding-down ring by forcing an inside annular flange thereof into an outside annular groove on the holding-down ring, causing the holding-down ring and the locating socket to securely fix the front fork to the head tube.

DETAILED DESCRIPTION OF THE PREFERRED EMBODIMENT

Figure 1:
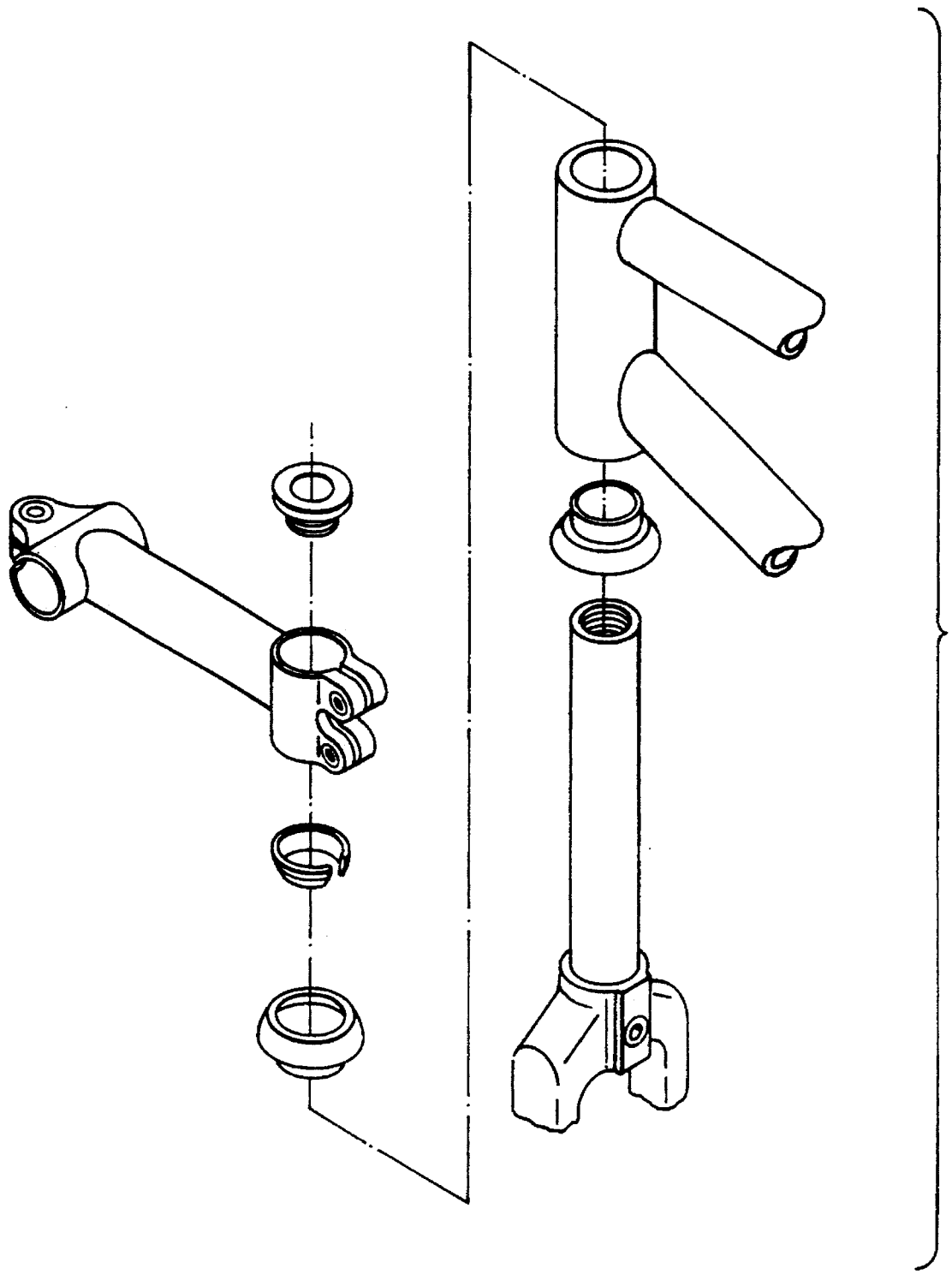
FIG. 1 is an exploded view of a bicycle front fork mounting structure according to the prior art.
Figure 2:
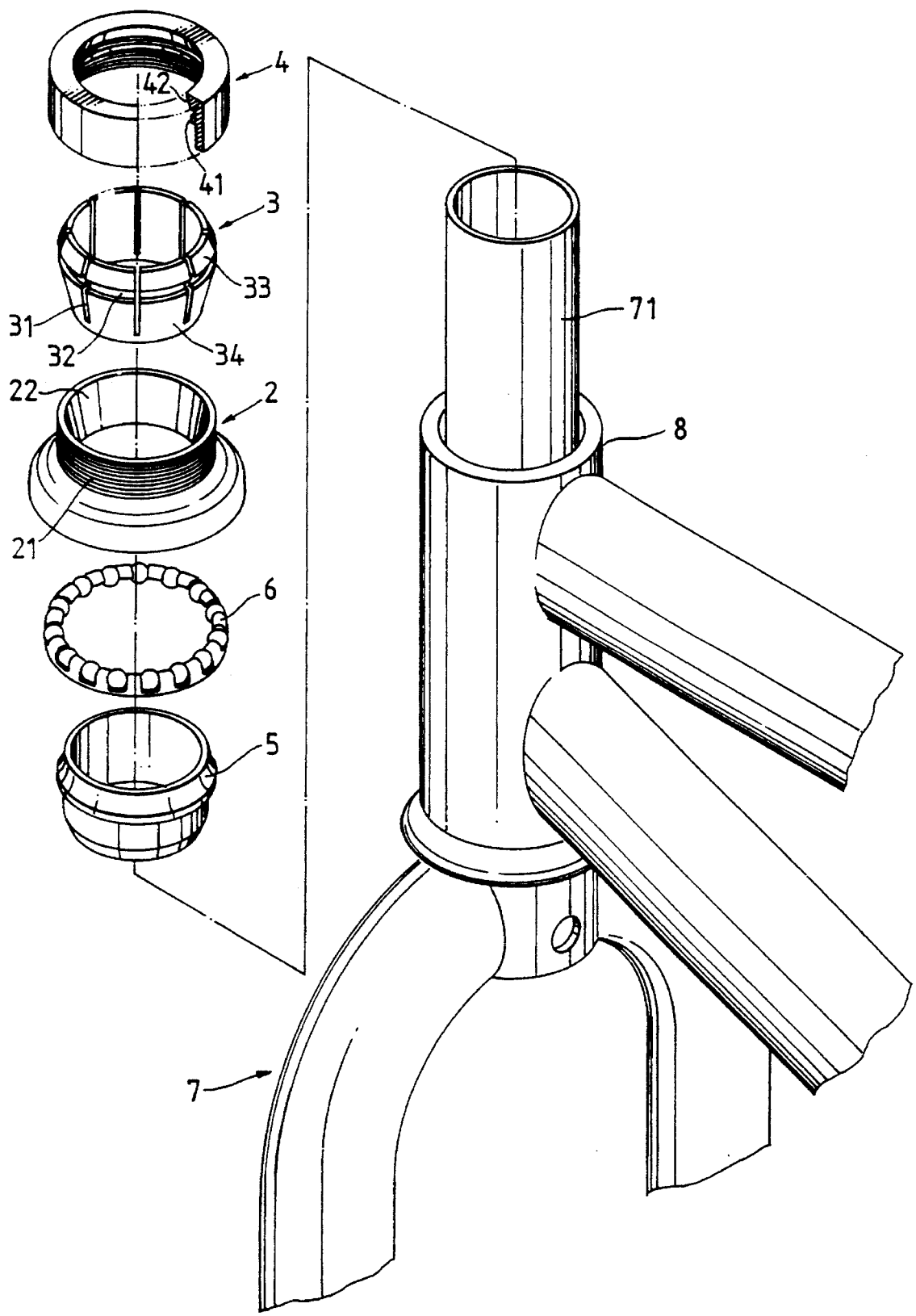
FIG. 2 is an exploded view of a bicycle front frok mounting structure according to the present invention.
Figure 3:
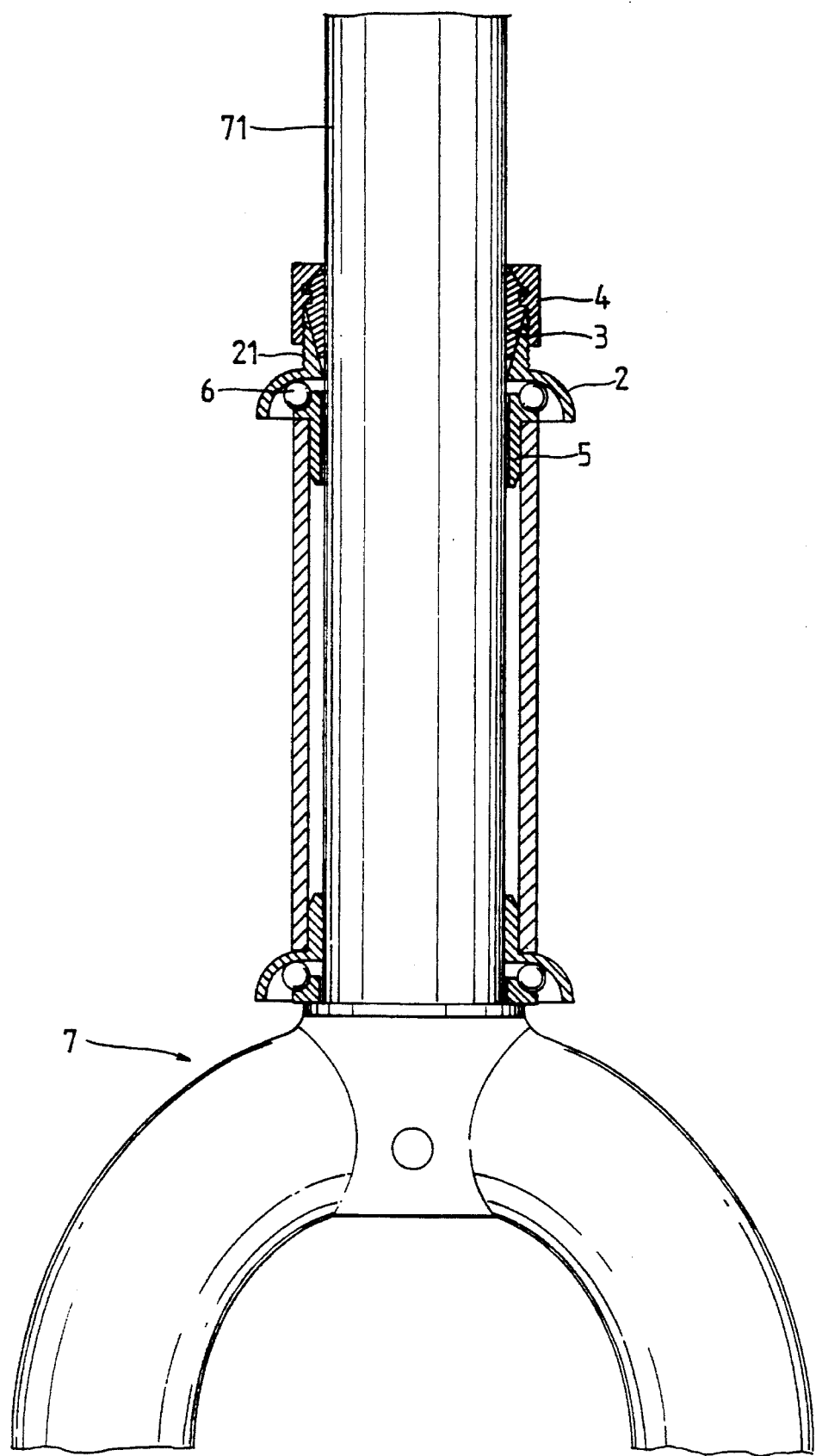
FIG. 3 is a longitudinal view in section showing the bicycle front fork mounting structure of FIG. 2 assembled.
Figure 4:
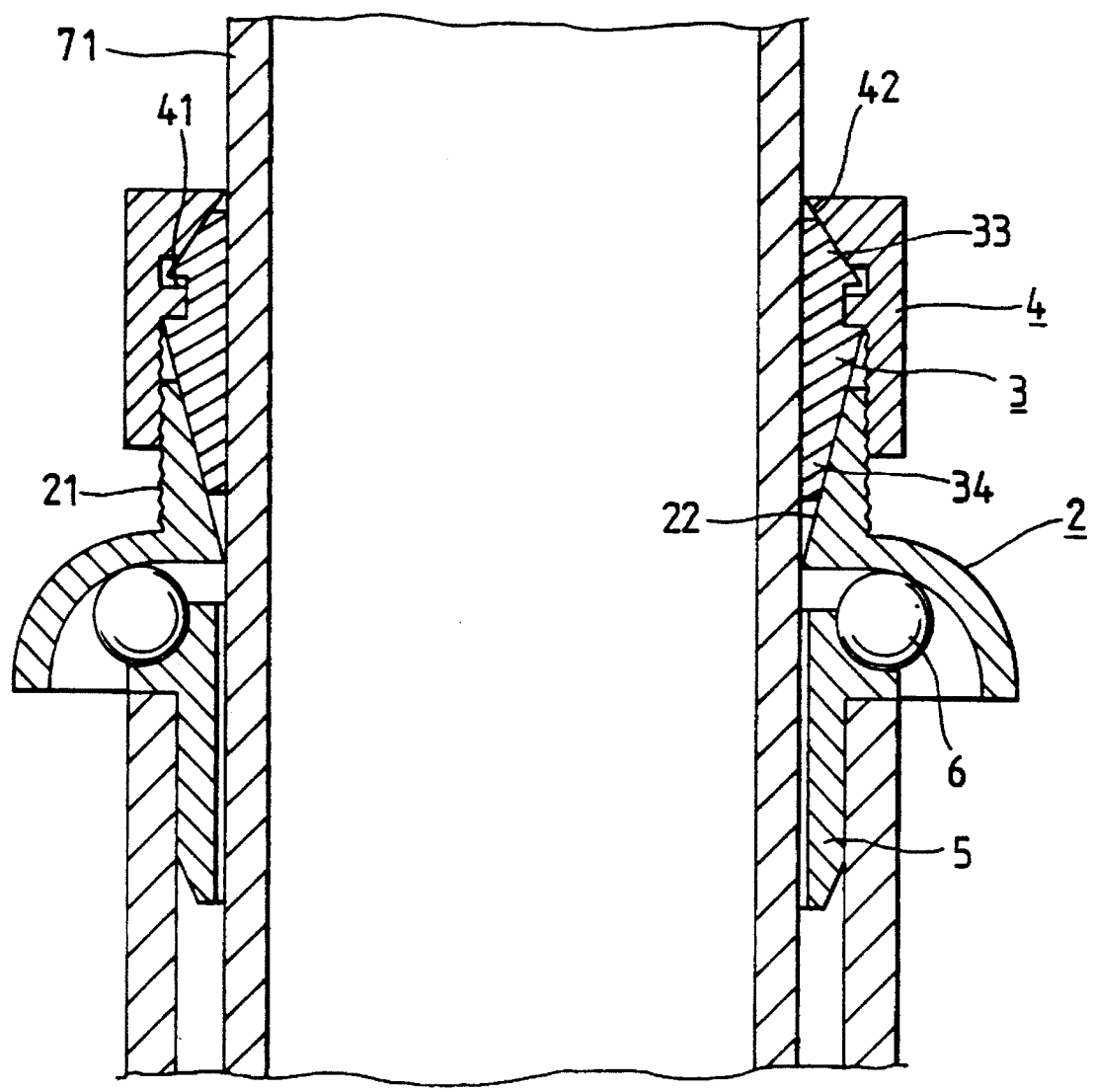
FIG. 4 is an enlarged view of the upper part of FIG. 3.

Referring to FIGS. 2, 3, and 4, a bicycle front fork mounting structure in accordance with the present invention is generally comprised of a locating socket 2, a holding-down ring 3, and a lock nut 4.

The locating socket 2 is mounted around the top coupling tube 71 of the front fork 7 and supported on a ball bearing 6, which is supported on a ring-shaped bearing block 5, which is mounted around the top coupling tube 71 of the front fork 7 and supported above the head tube 8. The socket 2 has a tapered center through hole 22, and an outer thread 21 around the tapered center through hole 22. The diameter of the tapered center through hole 22 is made gradually bigger toward the top. The holding-down ring 3 has a plurality of longitudinal splits 31, an annular groove 32 around the outside wall, a tapered top outer wall 33 and a tapered bottom outer wall 34 separated by the annular groove 32. The outer diameter of the top outer wall 33 and the outer diameter of the bottom outer wall 34 are made gradually smaller from the annular groove 32 toward reversed directions. The lock nut 4 has an inside annular flange 41 and a tapered inside surface portion 42 above the inside annular flange 41.

When the locating socket 2 is mounted around the top coupling tube 71 of the front fork 7 and supported on the ball bearing 6, the holding-down ring 3 is inserted into the tapered center through hole 22 of the locating socket 2, and then the lock nut 4 is threaded onto the outer thread 21 of the locating socket 2 to compress the holding-down ring 3 against the top coupling tube 71 of the front fork 7, causing the holding-down ring 3 and the locating socket 2 to securely fix the top coupling tube 71 of the front fork 7 to the head tube 8. When installed, the tapered bottom outer wall 34 and tapered top outer wall 33 of the holding-down ring 3 fit into the tapered center through hole 22 of the locating socket 2 and the tapered inside surface portion 42 of the lock nut 4 respectively, and the inside annular flange 41 of the lock nut 4 fits into annular groove 32 of the holding-down ring 3. Because the locating socket 2 bears horizontal components of force from the holding-down ring 3, less pressure is acted onto the ball bearing 6.

When the locknut 4 is disconnected from the locating socket 2, the holding-down ring 3 is released from the top coupling tube 71 of the front fork 7, and therefore the front fork 7 can be conveniently removed from the head tube 8 for a replacement or repair work.

I claim:

1. A bicycle front fork mounting structure comprising:

a locating socket mounted around a top coupling tube of a front fork and supported on a ball bearing, which is supported on a ring-shaped bearing block, which is mounted around said top coupling tube of said front fork and supported above a head tube of a bicycle frame, said locating socket having a tapered center through hole, and an outer thread around said tapered center through hole;

a holding-down ring mounted around said top coupling tube of said front fork and supported on said locating socket, said holding-down ring having a tapered bottom outer wall fitted into said tapered center through hole of said locating socket, a tapered top outer wall, an annular groove around the periphery between said tapered bottom outer wall and said tapered top outer wall, and a plurality of longitudinal splits;

a lock nut threaded onto said outer thread of said locating socket to compress said holding-down ring against said top coupling tube of said front fork, causing said holding-down ring and said locating socket to securely fix said front fork to said head tube, said lock nut comprising an inside annular flange fitted into said annular groove of said holding-down ring, and a tapered inside surface portion fitting over said tapered top outer wall of said holding-down ring.

* * * * *